United States Patent [19]

Föhl

[11] Patent Number: 5,261,697
[45] Date of Patent: Nov. 16, 1993

[54] PRETENSIONER IN A SAFETY BELT SYSTEM FOR VEHICLES

[75] Inventor: Artur Föhl, Schorndorf, Fed. Rep. of Germany

[73] Assignee: TRW Repa GmbH, Alfdorf, Fed. Rep. of Germany

[21] Appl. No.: 854,809

[22] Filed: Mar. 19, 1992

[30] Foreign Application Priority Data

Mar. 25, 1991 [DE] Fed. Rep. of Germany ....... 4109776

[51] Int. Cl.⁵ ............................................. B60R 22/46
[52] U.S. Cl. ..................... 280/806; 73/514; 116/203
[58] Field of Search ............. 280/806; 102/247; 200/61.45 R, 61.46, 61.49; 73/514; 116/203

[56] References Cited

U.S. PATENT DOCUMENTS

| | | | |
|---|---|---|---|
| 4,955,638 | 9/1990 | Kihoshita et al. | 280/806 |
| 5,163,709 | 11/1992 | Mori | 280/806 |

FOREIGN PATENT DOCUMENTS

| | | |
|---|---|---|
| 0456853 | 11/1991 | European Pat. Off. . |
| 4013046 | 10/1991 | Fed. Rep. of Germany . |
| 2220128 | 4/1990 | United Kingdom . |
| 2237180 | 1/1991 | United Kingdom . |
| 2250419 | 6/1992 | United Kingdom ............... 280/806 |

Primary Examiner—Eric D. Culbreth
Attorney, Agent, or Firm—Tarolli, Sundheim & Covell

[57] ABSTRACT

A belt pretensioner in a safety belt system for vehicles is equipped with a piston/cylinder linear drive which is activatable by a pyrotechnical gas generator and which is arranged in a support housing pivotally between a rest position and a triggering position. The piston/cylinder linear drive forms a vehicle-sensitive inertial mass which is loaded by spring bias in the direction of the rest position and movable by deceleration-induced inertial forces into the triggering position. The gas generator is provided with a percussion ignitor. Mounted on the support housing is a spring-loaded striking member which has an anvil for striking against the percussion ignitor and is held in a readiness position by engagement on a holding surface of the piston/cylinder linear drive.

12 Claims, 2 Drawing Sheets

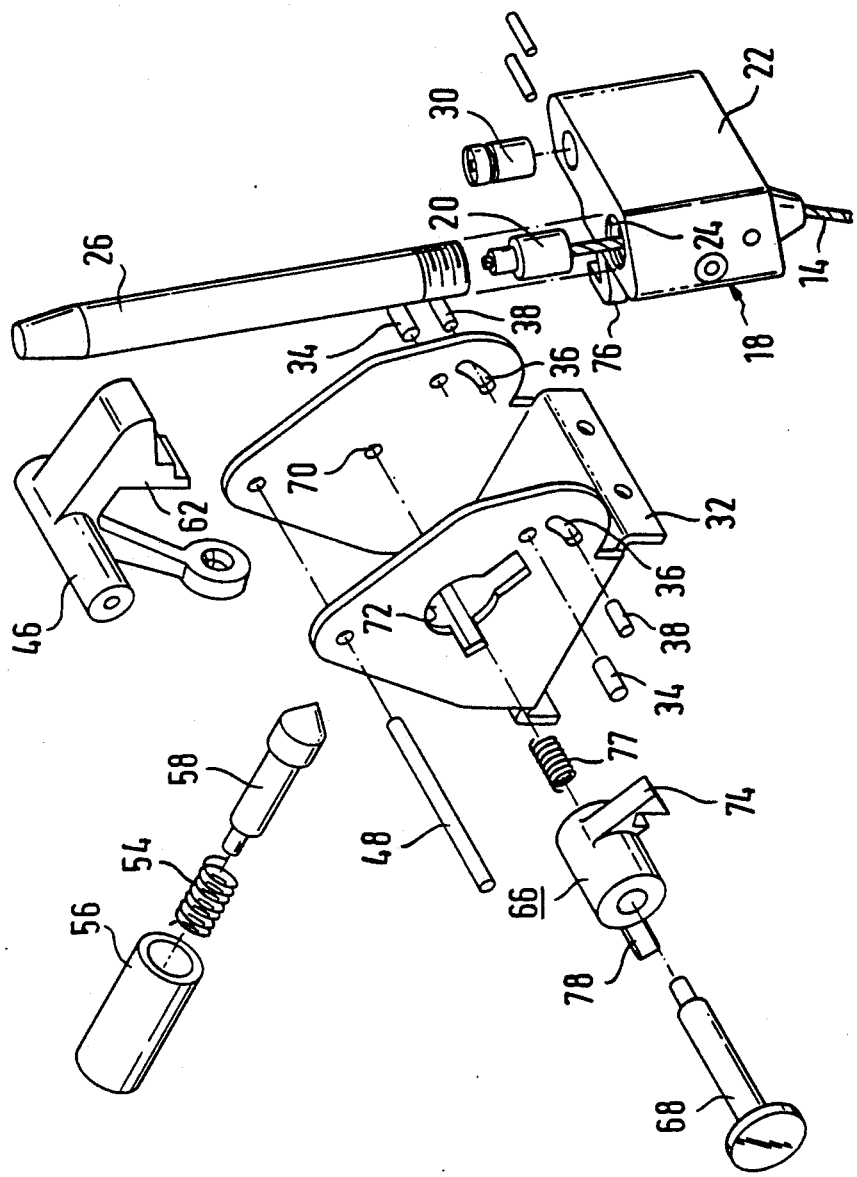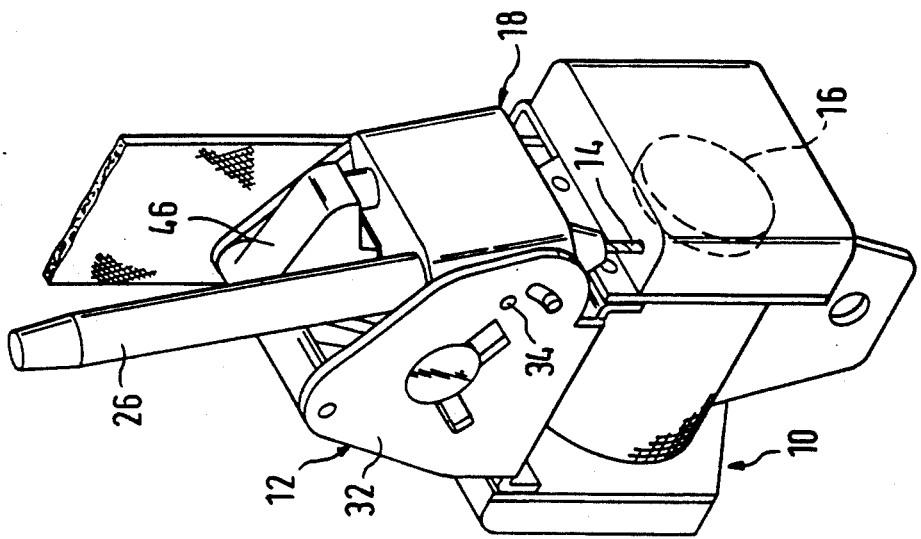

PRETENSIONER IN A SAFETY BELT SYSTEM FOR VEHICLES

The present invention relates to a belt pretensioner in a safety belt system for vehicles having a piston/cylinder linear drive which is activatable by a pyrotechnical gas generator which is arranged in a support housing.

The ignition of a pyrotechnical gas generator in a belt pretensioner for safety belt systems in vehicles can be effected by means of an electrical ignitor which is driven by an electronic central unit evaluating the vehicle retardation. However, the expenditure for such an electronic central unit and the electrical control lines necessary for each individual belt pretensioner is high.

A mechanical triggering of the pyrotechnical gas generator can take place by a drive mechanism which is equipped with a vehicle-sensitive movably mounted inertial mass. However, such a drive mechanism requires a considerable amount of space and thus cannot be employed under constricted installation conditions.

The present invention provides a belt pretension which permits mechanical firing of the gas generator and has minimum space and weight requirements.

The safety belt pretensioner of the invention comprises a piston/cylinder linear drive mounted on a support housing pivotally between a rest position and a triggered position. The piston/linear drive forms a vehicle-sensitive inertial mass which is loaded by spring bias in the direction towards the rest position and is movable by deceleration-induced inertial forces into the triggered position. The gas generator is equipped with a percussion ignitor. A spring-loaded striking member is mounted on the supporting housing and comprises an anvil for striking on the percussion ignitor, held in a readiness position by engagement on a holding surface of the piston/cylinder linear drive. Apart from piston and cylinder the piston/cylinder linear drive includes a gas generator and a bearing block in which the cylinder is mounted and the gas generator received. The assembly thus formed has a considerable mass which in the belt pretensioner according to the invention is used as vehicle-sensitive inertial mass. By omitting a separate inertial mass the space requirement and expenditure on material and assembly can be kept small.

To ensure reliable ignition the anvil must strike the percussion ignitor with a very high mechanical impulse. The mechanical energy necessary for this purpose is made available by a biased spring. To utilize optimally the mechanical energy stored in the biased spring the striking member in a preferred embodiment of the invention is constructed as two-armed impact lever which is pivotally mounted on the support housing and on the first arm of which the anvil is arranged; on triggering, by the biased spring the impact lever is accelerated and driven with its anvil against the percussion ignitor. To accelerate the impact lever to a maximum possible angular velocity said lever has a low mass; a particularly high mechanical impulse is achieved in that a major part of the mass of the impact lever is concentrated in the area of its anvil.

In a particularly advantageous embodiment the impact lever is loaded by a pressure spring which is supported between the end of the second lever arm and the piston/cylinder linear drive. The support point of the spring on the piston/cylinder linear drive lies in the vicinity of its pivot bearing on the side of the bearing block in which the cylinder and gas generator are arranged remote from the percussion ignitor. In this manner the pressure spring is given a double function: firstly, it provides the mechanical energy necessary for triggering the percussion ignitor and secondly it biases the vehicle-sensitive inertial mass formed by the piston/cylinder linear drive into its rest position and thus governs the release threshold at which firing of the gas generator takes place.

With a percussion ignitor it is essential for the impact to be guided directly centrally onto the impact surface. With the construction of the belt pretensioner described however, the percussion ignitor, since it is part of the movable vehicle-sensitive inertial mass, and the anvil are movable relatively to each other. To ensure an exactly central striking onto the impact surface of the percussion ignitor in spite of this, in the preferred embodiment the gas generator is provided with an impact transmission element which is arranged in front of its percussion ignitor and which is received and guided in a guide opening in the housing of the gas generator aligned with the impact surface of the percussion ignitor. Said impact transmission element projects out of the housing of the gas generator. It is preferably formed as pin or ball. The anvil provided with a blunt impact area need only strike the projecting end of the pin or ball; its axis may deviate considerably from that of the percussion ignitor.

Further features and advantages of the invention will be apparent from the following description and from the drawings to which reference is made and in which:

FIG. 1 is a schematic perspective view of a belt pretensioner integrated with a belt retractor to form an assembly;

FIG. 2 is an exploded view of the belt pretensioner shown in FIG. 1;

Figure 3:
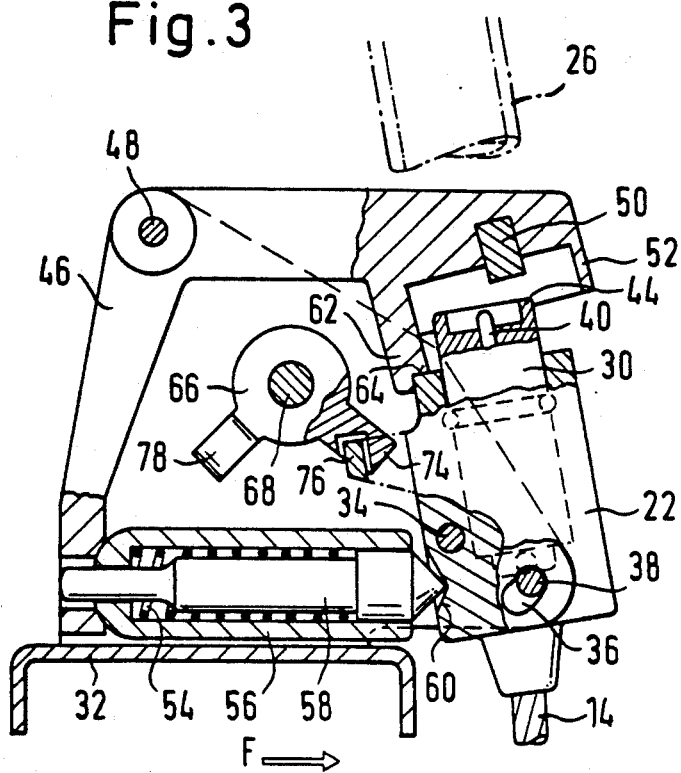
FIG. 3 is a sectional view of the belt pretensioner shown in FIGS. 1 and 2 in the rest position.
Figure 4:
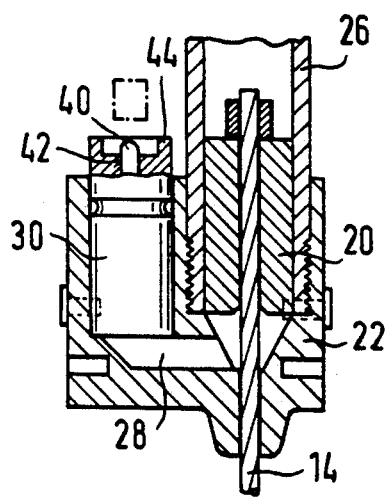
FIG. 4 is a detail view of a piston/cylinder linear drive for the belt pretensioner in axial section.

The assembly shown in FIG. 1 includes a belt retractor 10 and a belt pretensioner 12. The belt pretensioner 12 engages in a manner known per se via a pulling cable 14 on the periphery of a cable pulley 16 which is adapted to be coupled to the belt reel of the belt retractor 10. The belt pretensioner 12 includes a piston/cylinder linear drive 18, the piston 20 of which is secured to the end of the pulling cable 14.

Said piston/cylinder linear drive 18 comprises a bearing block 22 having a bore 24 into which the one end of the cylinder 26 of the piston/cylinder linear drive 18 is screwed. Said bore 24 communicates with a chamber 28 into which a gas generator 30 is inserted.

The bearing block 22 is pivotally mounted in a generally U-shaped support housing 32 by means of bearing pins 34. Two arcuate oppositely disposed slots 36, into each of which one of two stop pins 38 inserted laterally into the bearing block 22 engages, define in cooperation with said block the pivot movement of the piston/cylinder linear drive 18 relatively to the support housing 32 which is fixedly connected to the housing of the belt retractor 10.

The gas generator 30 is provided at its end projecting out of the bearing block 22 with a percussion ignitor. This percussion ignitor (conventionally constructed and therefore not shown) has a striking pin 40 which is guided in a guide bore 42 in the housing of the gas generator 30 exactly coaxially with the percussion ignitor of the gas generator. The outer end of the firing pin 40 projects out of the bottom face of the gas generator which is surrounded by a skirt 44 integrally formed on the housing of the gas generator.

Between the side plates of the support housing 32 a two-armed impact lever 46 is pivotally mounted on the bearing pin 48. Disposed on the first arm of said impact lever 46, in which the greater part of the mass of said lever is accumulated, there is an anvil 50 which has a blunt impact surface. The anvil 50 is surrounded by a skirt 52 which as, apparent from FIGS. 3 and 5 engages protectively around the end of the gas generator 30 provided with the percussion ignitor. The firing pin 40 is thus protected by the combined action of the skirts 44 and 52 from unintentional action from the outside which might lead to triggering the gas generator.

The impact lever 46 is biased by a pressure spring 54 in the sense of a movement of the anvil 50 against the striking pin 40. Said pressure spring 54 is accommodated in a hollow cylindrical guide sleeve 56 which bears with its one end on the free end of the second lever arm of the impact lever 46 and apart from the pressure spring 54 accommodates a ram 58 in displaceable manner. The end of the ram projecting out of the guide sleeve 56 is made conical and is supported in a notch 60 in the bearing block 22. Said notch 60 is arranged at a slight distance from the axes of the bearing pins 34 on the side remote from the percussion ignitor of the gas generator 30. The pressure spring 54 thus biases not only the impact lever 46 but also the bearing block 22 so that the latter is held in a stable rest position defined by engagement of the stop pins 38 on the one of the slots 36.

Said rest position is illustrated in FIG. 3.

The impact lever 46 is in turn held in this rest position by a lug 62 formed on its first lever arm, projecting towards the bearing block 22 and having a step-like surface bearing on a holding surface 64 on the adjacent end of the bearing block 22.

To secure the belt pretensioner against unintentional activation before installation in the vehicle an assembly securing means is provided which arrests the piston/cylinder linear drive 18 in its rest position shown in FIG. 3 but automatically cancels this arresting when the assembly consisting of belt retractor and belt pretensioner is assembled in the vehicle. This assembly securing means consists of a securing member 66 in the form of a two-arm lever which is axially displaceable on a bearing pin 68 by means of a hub. The bearing pin is secured in a bore 70 of the one side plate of the support housing 32. The opposite side plate of the support housing 32 comprises a cutout 72 which is so configured that the securing member 66 can be introduced axially into the space formed between the two side plates of the support member 32. The securing member 66 comprises on its one lever arm a hook 74 which engages behind a corresponding hook 76 formed on the bearing block 22 to secure the piston/cylinder linear drive in its rest position. By a pressure spring 77 the securing member 66 is biased into its securing position. The second lever arm of the securing member 66 forms an actuating nose or feeler 78 which projects laterally out of the support housing 22. On installation of the assembly consisting of the belt retractor 10 and belt pretensioner 12 in the vehicle bodywork said feeler 78 comes into engagement with the surface of the vehicle bodywork opposite it so that the securing member 66 is axially displaced against the action of the pressure spring 77 to release the hook 74 from the hook 76 and thus unlock the piston/cylinder linear drive.

Figure 5:
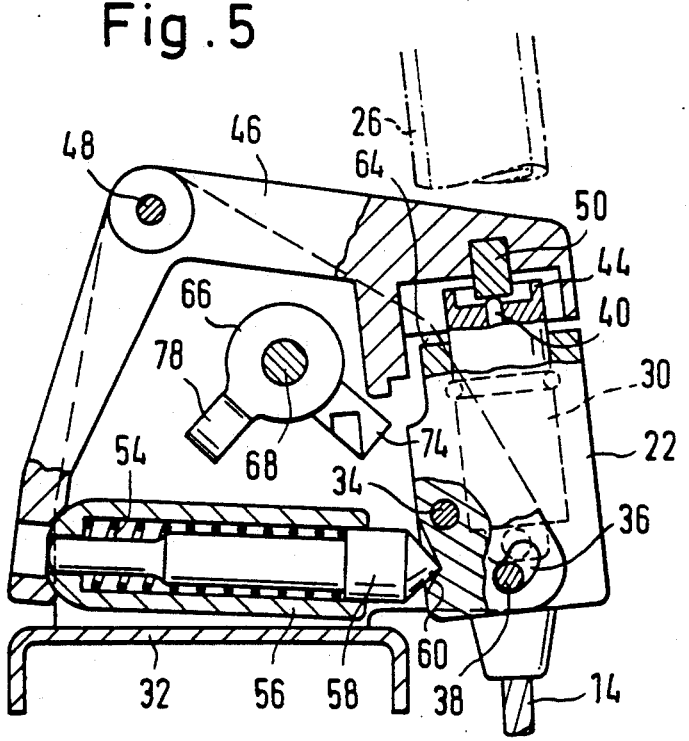
FIG. 5 is a sectional view of the belt pretensioner analogous to FIG. 3 but in the triggering position.

The belt pretensioner 12 is fitted into the vehicle at such an orientation that the bearing block 22 under inertial forces occurring on vehicle retardation tends to pivot out of the rest position shown in FIG. 3 in the direction of a release position which is defined by engagement of the stop pins 38 on the ends of the slots 36 adjacent the bottom of the bearing block 22. The travelling direction is indicated in FIG. 3 by an arrow F. The pivoting of the bearing block 22 with the cylinder 26 mounted therein takes place against the effect of the pressure spring 54 which, if the release threshold is not reached, presses said block back into the rest position. On pivoting of the bearing block 22 into the direction of the release position the step-shaped surface at the end of the lug 62 of the impact lever 46 slides beyond the holding surface 64 on the bearing block 22. As soon as the lug 62 has moved beyond the end edge of the holding surface 64 the impact lever 46 is released. It is now accelerated by the pressure spring 54 so that the anvil 50 is driven against the free end of the striking pin 40 which now, since the gas generator 30 with the bearing block 22 has been pivoted at least approximately into the triggering position shown in FIG. 5, is located opposite the anvil 50. The anvil 50 strikes against the striking pin 40 and drives the latter into the percussion ignitor, the gas generator 30 thereby being activated. By the ignition of the gas generator 30 gases are liberated which flow through the chamber 28 in the bearing block 22 into the lower end of the cylinder 26 and drive the piston 20 upwardly in the cylinder 26, the pulling cable 14 thereby being entrained. Said cable rotates the pulley 16 which is coupled automatically to the belt reel so as to remove the belt slack from the safety belt system by rotation of the belt reel.

I claim:

1. A pretensioner in a safety belt system for vehicle comprising a housing to be mounted in a vehicle, a piston/cylinder linear drive and a pyrotechnical gas generator for activating said piston/cylinder linear drive, said piston/cylinder linear drive being pivotally mounted on said housing and movable between a rest position and a triggered position, said piston/cylinder linear drive forming vehicle-sensitive inertial mass and being loaded by spring bias in a direction towards said rest position and being movable by deceleration-induced inertial forces towards said triggered position, said gas generator being provided with a percussion ignitor and a spring-loaded striking member being mounted on said housing and comprising an anvil for striking on the percussion ignitor, said striking member being held in a readiness position by engaging a holding surface on said piston/cylinder linear drive.

2. The pretensioner according to claim 1, wherein said striking member is formed as a two-armed impact lever which is pivotally mounted on the support housing and has a first arm provided with said anvil and said impact lever being biased by spring force in a direction of movement of the anvil against the percussion ignitor.

3. The pretensioner according to claim 2 wherein said impact lever comprises on its first arm adjacent the anvil a lug by which it bears on the holding surface of the piston/cylinder linear drive.

4. The pretensioner according to claim 2 wherein said spring force biasing the impact lever acts on the second lever arm thereof.

5. The pretensioner according to claim 4, wherein said spring force is generated by a pressure spring which is supported between the end of the second lever arm and the piston/cylinder linear drive.

6. The pretensioner according to claim 5, wherein said piston/cylinder linear drive has a cylinder with a first end accommodating said gas generator, a second opposite end and a pivot bearing between said first and second ends, said pressure spring engages a ram, said ram engaging said second end of said cylinder.

7. The pretensioner according to claim 6, wherein said pressure spring biases both the impact lever and the piston/cylinder linear drive.

8. The pretensioner according to claim 5, wherein said pressure spring urges on a ram, said ram and said pressure spring being guided in a cylindrical sleeve and said ram engaging said piston/cylinder drive.

9. The pretensioner according to claim 1, wherein said anvil is surrounded by a skirt which is formed on the striking member and which engages protectively around the end of the gas generator having the percussion ignitor.

10. The pretensioner according to claim 1 wherein said piston/cylinder linear drive is arrestable in its rest position by a securing member in the form of a two arm lever which is axially displaceably on a bearing pin provided with a hook on one lever arm engaging the piston/cylinder linear drive, the second lever arm of said securing member comprising an actuating lug projecting out of the support housing.

11. The pretensioner according to claim 1 wherein said gas generator is provided with an impact transmission element which is arranged in front of the percussion ignitor thereof and which is received and guided in a guide opening in the housing of the gas generator in alignment with the impact surface of the percussion ignitor, said impact transmission element projecting out of the housing of the gas generator.

12. The pretensioner according to claim 11, wherein said impact transmission element is a pin.

* * * * *